(12) United States Patent
Hunze et al.

(10) Patent No.: US 11,534,971 B2
(45) Date of Patent: Dec. 27, 2022

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Stephan Hunze, Lichtenfels (DE); Jens Junge, Neustadt bei Coburg (DE)

(73) Assignee: CONCEPT LASER GMBH, Lichtenfels (DE)

( * ) Notice: Subject to any disclaimer, the term of this patent is extended or adjusted under 35 U.S.C. 154(b) by 843 days.

(21) Appl. No.: 16/294,063

(22) Filed: Mar. 6, 2019

(65) Prior Publication Data

US 2020/0114580 A1  Apr. 16, 2020

(30) Foreign Application Priority Data

Oct. 12, 2018 (EP) .................................... 18200248

(51) Int. Cl.
*B29C 64/268* (2017.01)
*B33Y 30/00* (2015.01)
*B29C 64/393* (2017.01)
*B29C 64/10* (2017.01)
*B29C 64/20* (2017.01)
*B33Y 10/00* (2015.01)
*B33Y 50/02* (2015.01)

(52) U.S. Cl.
CPC ............ *B29C 64/268* (2017.08); *B29C 64/10* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/268; B29C 64/10; B29C 64/393; B29C 64/35; B29C 64/364; B29C 64/20; B29C 64/386; B29C 64/153; B33Y 10/00; B33Y 30/00; B33Y 50/02
USPC ........................................................ 700/117
See application file for complete search history.

(56) References Cited

U.S. PATENT DOCUMENTS 10,611,092 B2    4/2020  Buller et al.
10,946,441 B2 *  3/2021  Schilling ................. B22F 12/00
(Continued)

FOREIGN PATENT DOCUMENTS

KR           100709036 B1     4/2017

OTHER PUBLICATIONS

European Search Report Corresponding to EP18200248 dated Mar. 26, 2019.

*Primary Examiner* — Michael J Brown
(74) *Attorney, Agent, or Firm* — Dority & Manning, P.A.

(57) ABSTRACT

Apparatus (1) for additively manufacturing three-dimensional objects (2) by means of successive layerwise selective consolidation of layers of a build material (3) which can be consolidated by means of an energy source (4), which apparatus (1) comprises an optical unit (10) with at least one optical surface (9) arranged in a process chamber (6) of the apparatus (1), wherein the apparatus (1) comprises at least one determination device (12) with at least one light source (13) and at least one determination unit (14) adapted to determine at least one radiation parameter of radiation (15) emitted from the light source (13) and reflected at the optical surface (9) of the optical unit (10), wherein the determination device (12) is adapted to determine at least one condition information of the optical unit (10) based on the determined radiation parameter.

19 Claims, 2 Drawing Sheets

(56) References Cited

U.S. PATENT DOCUMENTS

Figure 1:
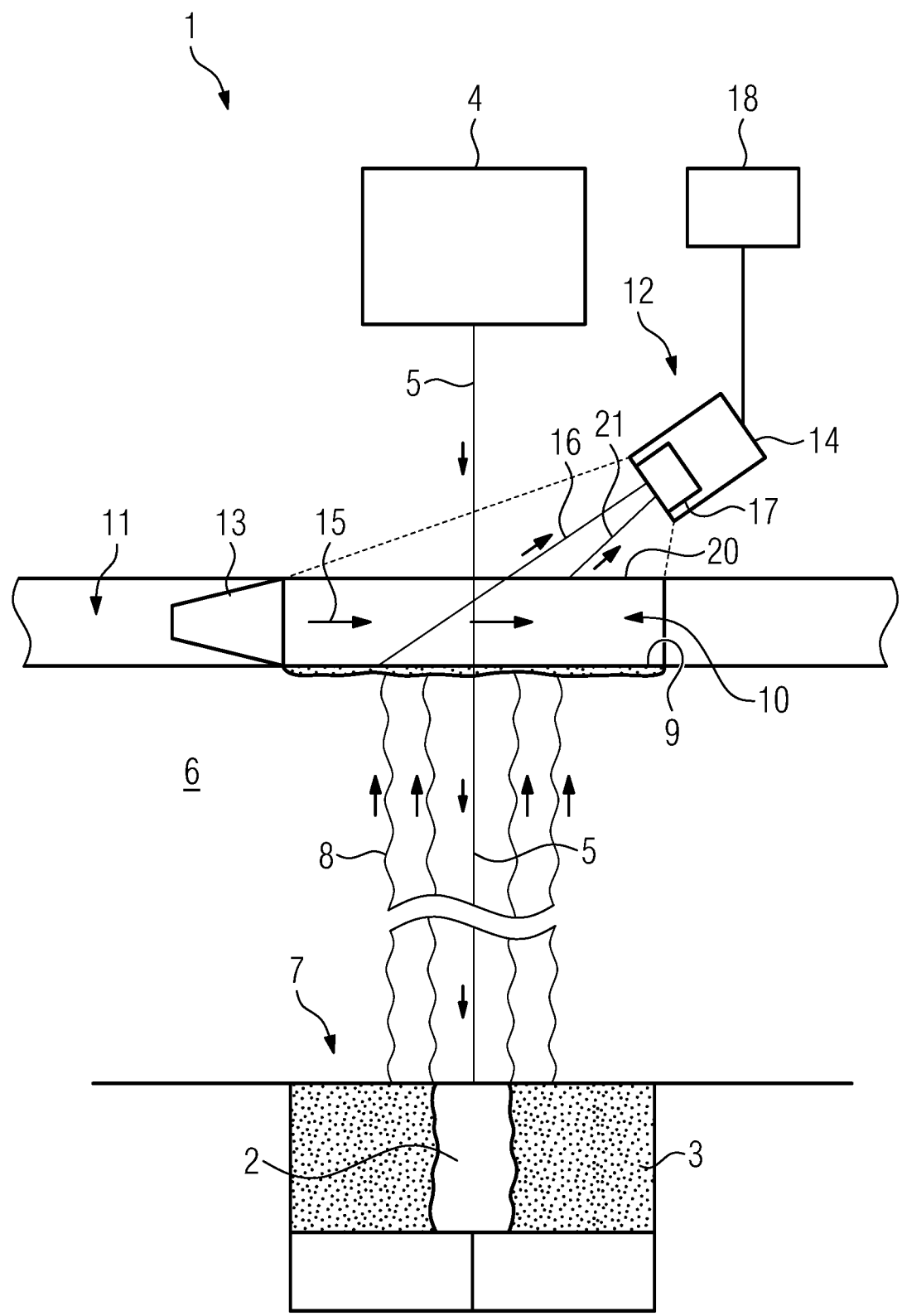

| | | | |
|---|---|---|---|
| 2006/0219875 A1* | 10/2006 | Yamada | G01S 17/48 |
| | | | 250/221 |
| 2016/0236279 A1* | 8/2016 | Ashton | G01N 21/274 |
| 2017/0341143 A1 | 11/2017 | Abe et al. | |
| 2017/0341183 A1 | 11/2017 | Buller et al. | |
| 2020/0114580 A1 | 4/2020 | Hunze et al. | |
| 2022/0111599 A1 | 4/2022 | Mamrak et al. | |

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 200 248.5 filed Oct. 12, 2018, the contents of which is incorporated herein by reference in its entirety as if set forth verbatim.

The invention relates to an apparatus for additively manufacturing three-dimensional objects by means of successive layerwise selective consolidation of layers of a build material which can be consolidated by means of an energy source, which apparatus comprises an optical unit with at least one optical surface arranged in a process chamber of the apparatus.

Apparatuses for additively manufacturing three-dimensional objects comprising optical units with at least one optical surface arranged in a process chamber of the apparatus are generally known from prior art. Typically, such apparatuses comprise a process chamber in which additive manufacturing processes are performed, e.g. in which a (powdery) build material is selectively consolidated to successively build the three-dimensional object.

Further, it is known from prior art that various optical units, such as windows of the powder chamber or lenses or the like can be used in the additive manufacturing process. Optical surfaces of these optical units, e.g. the surfaces of a lens or a window of the process chamber, e.g. a window through which an energy beam can be guided into the process chamber or a window through which an operator or a determination device may monitor the manufacturing process. Such optical surfaces are exposed to the environment inside the process chamber, i.e. the optical surface that is arranged in the process chamber, e.g. delimiting the process chamber in case of a window, is in direct contact with the environment in the process chamber. During the additive manufacturing process residues are generated, such as soot, smoke or smolder or non-consolidated build material particles, which residues may adhere to the optical surface of the at least one optical unit. Thus, it is possible that the optical surface is successively contaminated thereby, negatively influencing the transmission behavior of the optical surface. For example, an energy beam is at least partially absorbed or scattered/reflected at residues adhered to the optical surface of a window through which the energy beam is coupled/guided into the process chamber.

Therefore, it is necessary that the respective optical unit is cleaned or exchanged regularly. Typically, a cleaning or an exchange of the optical unit is performed in defined time intervals during an additive manufacturing process or between additive manufacturing processes. However, a cleaning or an exchange of the optical unit may become necessary before the defined time interval or before the additive manufacturing process is over, respectively. Further, if the defined time interval is chosen too short, an exchange or cleaning process is performed too often, wherein the additive manufacturing process is unnecessarily interrupted.

It is an object of the present invention to provide an improved apparatus for additively manufacturing three-dimensional objects, wherein in particular negative influences of at least one contaminated optical unit on the additive manufacturing process can be reduced or avoided and cleaning or exchange processes of an optical unit can be performed more efficiently.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the apparatus comprises at least one determination device with at least one light source and at least one determination unit adapted to determine at least one irradiation parameter of radiation emitted by the light source and reflected at the optical surface of the optical unit, wherein the determination device is adapted to determine at least one condition information of the optical unit based on the determined radiation parameter.

Thus, the determination device can be used to emit radiation via the light source, which is incident on the optical unit, preferably coupled into the optical unit. Residues adhered to the optical surface of the optical unit scatter or reflect the radiation, respectively, wherein the determination unit can determine the reflected radiation, in particular at least one radiation parameter of the radiation reflected at the optical surface of the optical unit. In other words, dependent on the residues, in particular the amount of residues, that are adhered to or deposited on the optical surface of the optical unit, a defined ratio of the radiation that is emitted via the light source is reflected towards the determination unit. Therefore, it is possible to determine at least one condition information of the optical unit based on the determined radiation parameter.

The term "reflected" may refer to any arbitrary way in which a part of the radiation that is generated via the light source is propagating towards the detector. Preferably, radiation is uncoupled from the optical unit due to the residues present on the optical surface. Thus, radiation may be reflected, scattered or otherwise guided towards/detectable with the determination unit.

The condition information may preferably relate to a contamination degree of the optical surface of the optical unit, in particular to a contamination with residues, and/or an operational state of the optical unit, in particular an integrity of the optical unit, e.g. indicate whether the optical unit is damaged. The term "contamination" may relate to an amount of residues that are adhered to the optical surface of the optical unit. For example, the more residues deposited on the optical surface of the optical unit, the more radiation is guided towards the determination unit. Also, the more residues present on the optical surface, the less radiation, e.g. of an energy beam, can pass the optical unit, as a defined part of the radiation is reflected, scattered or absorbed via the residues. Thus, determining the condition information enables a determination or a decision whether the optical surface of the optical unit needs to be exchanged or cleaned or whether the optical surface is not contaminated with residues.

As described before, the determination unit may be adapted to determine the radiation parameter of radiation emitted from the light source and reflected at at least one particle adhered to the surface of the optical unit. The term "optical unit" may, inter alia, refer to any unit that is arranged in the beam path of an energy source, e.g. an energy beam, that is used to irradiate build material in the build plane. It is particularly preferred that the optical unit refers to a process window through which the energy beam propagates into the process chamber, e.g. that protects at least one optical component, such as a lens or a lens assembly of an irradiation device, a beam guiding unit, such as a scanner or the like from the conditions inside the process chamber.

According to a preferred embodiment of the inventive apparatus, the determination unit may be adapted to determine an intensity of the reflected radiation. Since the intensity of the radiation that is determined via the determination unit directly relates to the intensity of radiation that is reflected at residues adhered to the optical surface of the optical unit, it is possible to use the determined intensity of the reflected radiation for determining the contamination information, preferably relating to a degree of contamination of the optical surface.

In other words, it is possible to determine the intensity of the radiation that is reflected at the optical surface and conclude on or derive the amount of residues that are deposited on the optical surface leading to the reflection of radiation with that corresponding intensity. For example, an optical surface of an optical unit that is free of residues does (dependent on how the radiation is incident on/coupled into the optical unit) not reflect any of the radiation emitted from the light source, whereas related with an increasing amount of residues the intensity that is determined via the determination unit increases.

It is particularly preferred that the light source is adapted to essentially radially couple the emitted radiation into the optical unit with respect to an optical axis of the optical unit. For example, the light source may be arranged in that the radiation may be coupled radially, e.g. at the rim or an edge, into the optical unit, such as a window or a lens. Thus, the radiation may propagate through the optical unit without any (additional) reflection, if the optical surface of the optical unit is free of residues. The term "radially" may therefore, be understood as towards the center or a central plane of the optical unit. Each particle adhered to the optical surface leads to an uncoupling of radiation out of the optical unit (radiation leaving the optical unit) and therefore, radiation being reflected at the optical surface of the optical unit that can be detected via the determination unit.

The light source may, inter alia, be built as light emitting diode (LED) or the light source may comprise at least one optical fiber via which light can be guided to the optical unit and coupled into the optical unit, as described before. The light source may be adapted to emit radiation and couple the radiation into the optical unit. The radiation coupled into the optical unit may essentially propagate in parallel to at least one optical surface of the optical unit, wherein the optical unit behaves as a light conductor. In regions in which residues are present on the optical surface, radiation is decoupled from the optical unit and therefore, can be detected via the determination unit. Due to the optical unit conducting the radiation emitted from the light source, a major part of the radiation propagates through the optical unit towards an opposing side of the optical unit with respect to the position of the light source. The radiation angle under which the light source emits the radiation is preferably chosen in that the radiation is incident on the optical surface from within the optical unit, but a direct propagation of the radiation from the light source to the determination unit is avoided.

The determination unit and/or the light source may be arranged in that the radiation emitted from the light source cannot directly propagate to the detector of the determination unit, e.g. can propagate along a direct line from the light source to the detector. Thus, it can be assured that radiation emitted by the light source and detected by the determination unit results from residues present on the optical unit and not from the light source itself.

For example, a lens hood or a lens shade can be used with the determination unit that limits the angle of acceptance under which radiation emitted from the light source can be received by the determination unit. It is also possible to use a suitable filtering unit, e.g. dampening a certain part of the radiation emitted by the light source.

The light source may preferably be adapted to emit radiation of a different wavelength than radiation emitted by the energy source, preferably in the visual spectrum, in particular blue light. Dependent on the energy source that is used to (selectively) irradiate and consolidate the build material, a wavelength of the light source can be chosen. By providing a light source that is adapted to emit radiation of the different wavelength than the radiation used to consolidate the build material, e.g. the wavelength of an energy beam, it is possible to determine the at least one radiation parameter of the reflected radiation and therefore, determine the condition information without any influence caused by the energy source, e.g. the energy beam being reflected at the optical surface. Hence, if an energy beam, such as a laser beam, with a wavelength in the near infrared spectrum is used to consolidate the build material, it is beneficial to use a light source that is adapted to emit blue light.

Further, the determination device may comprise a filter unit that is adapted to filter radiation deviant from a wavelength of the light source. Alternatively, the detector of the determination unit may only be sensitive to the radiation emitted from the light source. For example, radiation emitted from the energy source may be filtered and therefore, it may be avoided that radiation emitted by the energy source is incident on the determination unit. It is also possible that the detector is not sensitive for the radiation emitted from the energy source.

According to another embodiment of the inventive apparatus, the light source of the determination device may at least partially be integrated in a frame of the optical unit, preferably in a wall of the process chamber. As described before, it is particularly preferred that the light source emits radiation radially with respect to the optical axis or a central axis/plane of the optical unit, in particular adapted to radially couple the radiation into the optical unit. The light source may further be integrated in a frame of the optical unit, e.g. a frame that at least partially surrounds the optical unit, wherein the light source is protected from the environment inside the process chamber by the integration in the frame of the optical unit. For example, if the optical unit is integrated in a wall of the process chamber itself, such as a process chamber window, the light source may also be integrated into the wall of the process chamber being arranged in that the light source is adapted to radially emit the radiation towards the center of the optical unit.

The inventive apparatus may further be improved in that the determination device may be adapted to output at least one signal dependent on the determined condition information, in particular with a degree of contamination above a defined threshold value. Hence, the determination device may continuously or in defined time intervals determine the condition information of the at least one optical unit, e.g. the condition information of a window of the process chamber of the apparatus. Dependent on the determined condition information, e.g. relating to the contamination degree of the optical unit, preferably if the contamination degree is above a defined threshold value, it is possible that the determination device outputs a signal, e.g. indicating that an exchange or a cleaning of the optical surface of the optical unit is necessary. The defined threshold may be defined in that, for example, the signal can be output above a certain intensity of the radiation that is reflected at the optical surface and determined via the determination unit.

The determination device may further be adapted to initiate an exchange or a cleaning of the at least one optical surface of the optical unit dependent on the condition information. Thus, the signal, as described before, can be used to initiate an exchange or a cleaning process of the at least one optical surface of the optical unit. Therefore, the cleaning process or the exchange process can be performed based on the need for cleaning or exchanging the optical unit assuring that the optical unit is cleaned or exchanged whenever the amount of residues deposited on the optical surface requires an exchange or a cleaning of the optical surface to prevent negative influences on the additive manufacturing process.

Further, the determination device or a separate control unit may be adapted to compare a determined condition information before and after a cleaning process and adapted to determine at least one cleaning process parameter, in particular a cleaning efficiency. As described before, if the condition information, e.g. the contamination degree of the optical surface is above a defined threshold value, it is possible to initiate a cleaning process. Preferably, the determination device continuously determines the condition information, in particular the contamination degree. The condition information can be determined before and after a cleaning process has been performed and both values of the determined condition information can be compared. Thus, the efficiency of the cleaning process, e.g. the amount of residues removed via the cleaning process, can be determined. Hence, it is possible to determine the status of the cleaning device, e.g. indicating whether the cleaning device itself has to be serviced.

Preferably, the at least one condition information may be related via the determination device to at least one process step of an additive manufacturing process performed on the apparatus. In other words, it is possible to determine the condition information for more than one process step of the additive manufacturing apparatus, e.g. for multiple irradiation process steps in which build material is selectively irradiated. By relating the condition information, e.g. relating to or indicating the degree to which the optical surface is contaminated with residues, it is possible to conclude on the effects the contamination of the optical surface has on the corresponding process step. Thus, it is possible to determine the effect of the residues adhered to the optical surface, e.g. absorbing a part of the energy beam, during the irradiation of build material.

It is particularly preferred that the determination unit may be adapted to locally resolve the condition information, in particular adapted to resolve a condition information for at least two different surfaces of the optical unit. According to this embodiment, the determination unit may be used to locally resolve the condition information, for example different regions of a detector of the determination unit. A CCD-chip or a CMOS-sensor may be used to locally resolve the condition information. For example, the optical surface may be imaged onto the detector of the determination unit and therefore, the intensity of radiation incident on the individual pixels can be determined. Thus, it is possible to locally resolve the condition information and therefore, determine which parts or regions of the optical surface are contaminated with residues leading to a corresponding contamination degree.

It is also possible to resolve the condition information for at least two different surfaces of the optical unit, for example an upper surface and a lower surface of a window in the process chamber, i.e. an optical surface of the window in the process chamber facing inside the process chamber and the opposing optical surface that faces the beam guiding unit, for instance. Preferably, it is possible that based on the locally resolved condition information, a (virtual) map can be generated, preferably a two-dimensional or a three-dimensional map, indicating the locally resolved condition information for manufacturing of at least one layer of the object in the additive manufacturing process. Hence, the map, in particular the two-dimensional map can be used to indicate the condition information of the optical surface two-dimensionally, for example a color-coded information of the contamination degree of the optical surface can be output to an operator of the apparatus.

It is also possible to generate a three-dimensional map wherein a two-dimensional map is stored for each layer (or selected layers) of the three-dimensional object that is additively built during the manufacturing process, wherein each layer of the three-dimensional map can be displayed color-coded to a user, wherein it is possible that the user may conclude from the three-dimensional map on the condition information of the optical surface during the additive manufacturing process of each layer of the object.

According to another preferred embodiment of the inventive apparatus, the determination device may comprise at least two light sources arranged in a predefined pattern along the at least one edge of the optical unit, preferably equidistantly along the longest edge and/or circumferentially arranged. Hence, the determination device may comprise more than one light source, for example a plurality of light sources that can be arranged at least partially around the optical unit, in particular in that the light sources can emit radiation that can be coupled into the optical unit, e.g.

arranged circumferentially or along the longest edge of the optical unit. For example, if the optical unit is built as process window in the process chamber of the apparatus, light sources may be arranged in parallel along the longest edge of the rectangular process window. Of course, it is also possible to otherwise arrange the plurality of light sources, e.g. at least partially circumferentially around an annular optical unit or the like. By providing more than one light source it is possible to more uniformly distribute the radiation through the optical unit and therefore, improve the detection quality of radiation reflected at the optical surface.

As described before, the optical unit may be built as or may comprise a window of the process chamber, in particular a window separating an irradiation device from the process chamber. Hence, it is possible that the process chamber comprises one or more windows, for example windows that separate an irradiation device from the process chamber. Thus, the window may be used to protect the irradiation device from the conditions inside the process chamber, in particular heat and residues generated in the additive manufacturing process. As these residues successively contaminate the window by adhering to the window, the intensity of an energy beam that is guided through the window is influenced.

In particular, an increasing amount of energy is absorbed by residues adhered to the window. Thus, by continuously determining the condition information of the window, in particular the contamination degree of the window, it is possible to determine when an exchange or a cleaning process of the window is necessary.

Besides, the invention relates a determination device for an apparatus for additively manufacturing three-dimensional objects by means of successive layerwise selective irradiation and consolidation of layers of a build material which can be consolidated by means of an energy source, which apparatus comprises an optical unit with at least one optical surface arranged in a process chamber of the apparatus, wherein the determination device comprises at least one light source and at least one determination unit adapted to determine at least one radiation parameter of radiation emitted from the light source and reflected at the surface of the optical unit, wherein the determination device is adapted to determine at least one condition information of the optical unit based on the determined radiation parameter.

Further, the invention relates to a method for determining at least one condition information of an optical unit of an apparatus for additively manufacturing three-dimensional objects by means of successive layerwise selective irradiation and consolidation of layers of a build material which can be consolidated by means of an energy source, which apparatus comprises an optical unit with at least one optical surface arranged in a process chamber of the apparatus, wherein at least one radiation parameter of radiation emitted from a light source of a determination device is determined which radiation is reflected from the surface of the optical unit and at least one condition information of the optical unit is determined based on the determined radiation parameter.

Of course, all details, features and advantages described with respect to the inventive apparatus are fully transferable to the inventive determination device and the inventive method.

Figure 2:
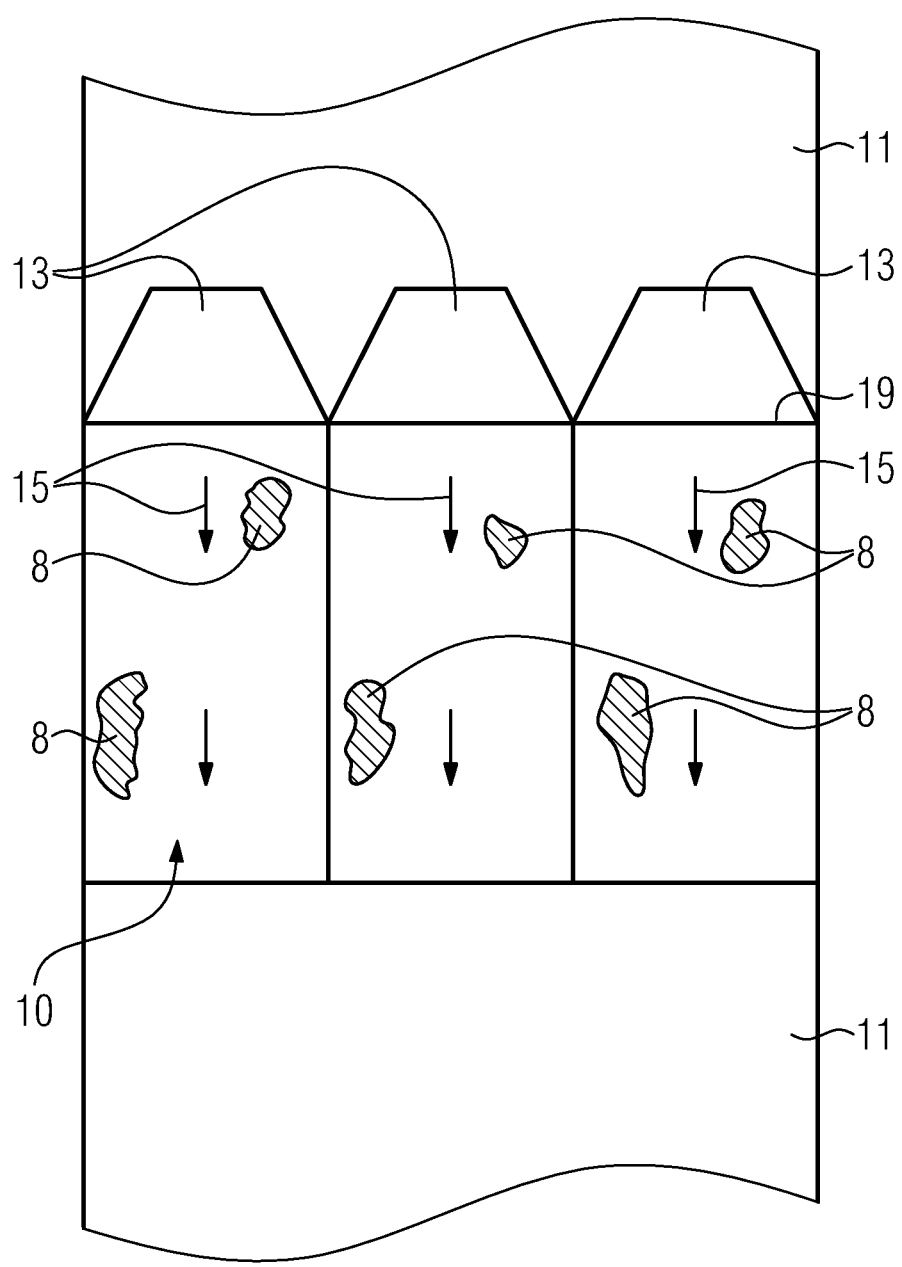

Exemplary embodiments of the invention are described with reference to the Fig. The Fig. are schematic diagrams, wherein FIG. 1 shows a part of an inventive apparatus in side view; and FIG. 2 shows the part of the inventive apparatus of FIG. 1 in top view.

FIG. 1 shows an apparatus 1 for additively manufacturing three-dimensional objects 2 by means of successive layerwise selective consolidation of layers of a build material 3 which can be consolidated by means of an energy source 4, e.g. a laser source adapted to generate an energy beam 5 such as a laser beam. The energy beam 5 is guided into a process chamber 6, i.e. a chamber in which the additive manufacturing process for additively manufacturing the three-dimensional object 2 is performed.

As can be derived from FIG. 1, the energy beam 5 is selectively guided across a build plane 7 i.e. the plane in which build material 3 is arranged to be selectively irradiated and consolidated via the energy beam 5. In the irradiation processes residues 8 are generated, such as soot, smoke and smolder or non-consolidated build material particles that are stirred up, for instance. The residues 8 can adhere to surfaces inside the process chamber 6, for example an optical surface 9 of an optical unit 10. In this exemplary embodiment, the optical unit 10 is built as window in a wall 11 of the process chamber 6. In other words, the energy beam 5 passes the optical unit 10 on the beam path along which the energy beam 5 is guided to the build plane 7.

As the residues 8 can adhere to the optical surface 9 or are deposited on the optical surface 9, the transmission of the energy beam 5 through the optical unit 10 can be negatively influenced by the residues 8. In particular, it is possible that a certain part of the energy beam 5 is absorbed or scattered or reflected via the residues 8 adhered to the optical surface 9. Therefore, an exchange, preferably a cleaning process of the optical surface 9 of the optical unit 10 can become necessary, if a contamination degree indicating that the amount of residues deposited on the optical surface 9 exceeds a defined threshold value. For determining a condition information of the optical unit 10, for example the contamination degree, the apparatus 1 comprises a determination device 12 that comprises a light source 13 and a determination unit 14. The light source 13 is adapted to couple radiation 15 into the optical unit 10, in particular couple the radiation 15 radially into the optical unit 10, e.g. towards an optical axis or a central plane of the optical unit 10.

In this exemplary embodiment, the optical unit 10 is a rectangular window, wherein the light source 13 is arranged in the wall 11 of the process chamber 6 and adapted to couple the radiation 15 into the optical unit 10 towards a central plane of the optical unit 10. Hence, the radiation 15, for example a light beam, propagates through the optical unit 10, wherein residues 8 adhered to the optical surface 9 cause radiation 15 or at least a part of the radiation 15 to be decoupled from the optical unit 10 and leave the optical unit 10, e.g. causing a beam reflected towards the determination unit 14. Therefore, a reflected part 16 of the radiation 15 is incident on a detector 17 of the determination unit 14.

In other words, if no residues 8 are adhered to the optical surface 9, the radiation 15 can be coupled into the optical unit 10 without a reflected part 16 being reflected and decoupled from the optical unit 10 via residues 8. Thus, the determination unit 14 would not detect radiation and therefore, a "dark field" would be captured via the determination unit 14. Dependent on the degree of contamination, i.e. the amount of residues 8 adhered to the optical surface 9, an increasing part of the radiation 15 is reflected to the detector 17 of the determination unit 14. Thus, the condition information that can be generated via the determination device 12 is directly related to the amount of residues 8 deposited on or adhered to the optical surface 9. Therefore, the condition information may, inter alia, comprise a contamination degree indicating the degree to which the optical surface 9 is contaminated with residues 8. It is further possible to determine other conditions of the optical surface 9 such as damages, in particular cracks, in the optical surface 9 leading to a decoupling of radiation 15, in particular a reflected part 16 leaving the optical unit 10 towards the determination unit 14.

Hence, the determination unit 14 is adapted to determine an intensity of the reflected part 16 of the radiation 15, wherein dependent on the intensity that has been determined via the determination unit 14, the amount of residues 8 adhered to the optical surface 9 can be determined. Dependent on the amount of residues 8 adhered to the optical surface 9, the determination device 12 is adapted to output at least one signal, in particular a signal can be output to a control unit 18. The control unit 18 may therefore, initiate an exchange or a cleaning process of the at least one optical surface 9 of the optical unit 10. In other words, if the condition information that is generated via the determination unit 14, e.g. based on the intensity of the reflected part 16 of the radiation 15 exceeds a defined threshold value, a cleaning process of the optical surface 9 of the optical unit 10 can be deemed necessary and can be initiated.

Preferably, the condition information is determined continuously or in defined time intervals, wherein it is particularly possible that the condition information can be determined in advance to a cleaning process and after a cleaning process for determining the efficiency of the cleaning process. In other words, it is possible to determine the amount of residues 8 still adhered to the optical surface 9 after a cleaning process has been performed.

FIG. 2 shows a top view of the optical unit 10, wherein multiple light sources 13 are provided which are arranged in a defined pattern along a longer edge 19 of the rectangular optical unit 10. Hence, each of the light sources 13 generates radiation 15 coupled into the edge 19 of the optical unit 10. Dependent on the residues 8 adhered to the optical surface 9, the determination unit 14 can determine the intensity of the reflected part 16 of the radiation 15 and therefore, can determine the condition information, in particular the contamination degree. Further, it is possible that the determination unit 14 locally resolves the condition information, e.g. via a detector 17 that is built as a CMOS or CCD-chip, in particular comprising a grid-like shape, for example including a plurality of pixels.

Thus, it is possible to determine different intensity values of reflected parts 16 of the radiation 15 locally resolved over the optical unit 10. Hence, the condition information can be determined for different positions on the optical unit 10, in particular on the optical surface 9. Hence, it is possible to derive, whether residues 8 adhered to the optical surface 9 are in a critical position through which the energy beam 5 is guided into the process chamber 6, or whether residues 8 are deposited in less important regions of the optical unit 10. Therefore, it is possible to only perform a cleaning process of the optical surface 9, if residues 8 are at least partially adhered to the optical surface 9 in at least one critical position requiring a cleaning of the optical surface 9.

It is further possible to generate a map of the optical surface 9, indicating the condition information locally resolved. The map can further be generated as a three-dimensional map, wherein for each layer of the additive manufacturing process, it is possible to locally resolve the condition information. Thus, at least one process step, in particular every irradiation step in which build material 3 is irradiated to successively build the three-dimensional object 2, the condition information can be stored locally resolved, wherein each process step, such as an irradiation step, can be related to the condition information present during the corresponding irradiation step. Therefore, it is possible to derive whether and to which degree the optical surface 9 was contaminated during the corresponding process step.

Additionally, the determination unit 14 may distinguish between the reflected part 16 of radiation 15 reflected from the optical surface 9 that is facing the process chamber 6 and a reflected part 21 of the radiation 15 that is reflected from an optical surface 20 facing the energy source 4, for example facing an irradiation device outside the process chamber 6. Thus, it is possible to further determine a contamination of the upper surface of the optical unit 10, for example contaminated via dust or other particles.

Self-evidently, the inventive method may be performed on the inventive apparatus 1, preferably using an inventive determination device 12.

The invention claimed is:

1. An apparatus for additively manufacturing three-dimensional objects the apparatus comprising;
an optical unit with at least one optical surface arranged in a process chamber of the apparatus, wherein the optical unit comprises;
at least one determination device with at least one light source; and
at least one determination unit adapted to determine at least one radiation parameter of radiation emitted from the at least one light source and reflected at the optical surface of the optical unit,
wherein the at least one determination device is adapted to determine at least one condition information of the optical unit based on the determined radiation parameter, and wherein the at least one light source is adapted to emit radiation of a different wavelength than radiation emitted by the energy source.

2. The apparatus according to claim 1, wherein the at least one radiation parameter of radiation is an intensity of the reflected radiation.

3. The apparatus according to claim 1, wherein the at least one light source is adapted to essentially radially couple the radiation into the optical unit with respect to an optical axis of the optical unit.

4. The apparatus according to claim 1, wherein the at least one light source is adapted to emit radiation in the visual spectrum.

5. The apparatus according to claim 1, wherein the at least one determination device is adapted to output at least one signal dependent on the determined condition information.

6. The apparatus according to claim 1, wherein the at least one determination device is adapted to initiate an exchange or a cleaning of the at least one optical surface of the optical unit dependent on the condition information.

7. The apparatus according to claim 1, wherein the at least one determination device or a separate control unit is adapted to compare a determined condition information before and after a cleaning process and adapted to determine at least one cleaning process parameter.

8. The apparatus according to claim 1, wherein the at least one determination device or a separate control unit is adapted to relate the at least one condition information to at least one process step of an additive manufacturing process performed on the apparatus.

9. The apparatus according to claim 1, wherein the at least one determination unit is adapted to locally resolve the condition information.

10. The apparatus according to claim 9, wherein the at least one determination unit is adapted to generate a map, indicating the locally resolved condition information for manufacturing of at least one layer of the object.

11. The apparatus according to claim 9, wherein the at least one determination unit is adapted to resolve a condition information for at least two different optical surfaces of the optical unit.

12. The apparatus according to claim 1, wherein the optical unit comprises a window of the process chamber.

13. The apparatus according to claim 1, wherein the window separates an irradiation device from the process chamber.

14. An apparatus for additively manufacturing three-dimensional objects, the apparatus comprising:
an optical unit with at least one optical surface arranged in a process chamber of the apparatus, wherein the optical unit comprises:
at least one determination device with at least one light source, and
at least one determination unit adapted to determine at least one radiation parameter of radiation emitted from the light source and reflected at the optical surface of the optical unit,
wherein the at least one determination device is adapted to determine at least one condition information of the optical unit based on the determined radiation parameter, wherein the at least one light source of the at least one determination device is at least partially integrated in a frame of the optical unit.

15. The apparatus according to claim 14, wherein the at least one light source of the at least one determination device is at least partially integrated in a wall of the process chamber.

16. An apparatus for additively manufacturing three-dimensional objects, the apparatus comprising:
an optical unit with at least one optical surface arranged in a process chamber of the apparatus, wherein the optical unit comprises:
at least one determination device with at least one light source, and
at least one determination unit adapted to determine at least one radiation parameter of radiation emitted from the light source and reflected at the optical surface of the optical unit,
wherein the at least one determination device is adapted to determine at least one condition information of the optical unit based on the determined radiation parameter, wherein the at least one determination device comprises at least two light sources arranged in a predefined pattern along at least one edge of the optical unit.

17. The apparatus according to claim 16, wherein the at least one determination device comprises at least two light sources arranged in the predefined pattern equidistantly along the longest edge of the optical unit.

18. A determination device for an apparatus, wherein the apparatus comprises an optical unit with at least one optical surface arranged in a process chamber, the determination device comprising:
at least one light source; and
at least one determination unit adapted to determine at least one radiation parameter of radiation emitted from the light source and reflected at the optical surface of the optical unit,
wherein the determination device is adapted to determine at least one condition information of the optical unit based on the determined radiation parameter, and wherein the light source of the determination device is at least partially integrated in a frame of the optical unit.

19. A method for determining at least one condition information of an optical unit of an apparatus, wherein the apparatus comprises an optical unit with at least one optical surface arranged in a process chamber of the apparatus, the method comprising:
determining at least one radiation parameter of radiation emitted from a light source of a determination device wherein the radiation is reflected from the optical surface of the optical unit;
determining at least one condition information of the optical unit based on the determined radiation parameter; and
at least partially integrating the light source of the determination device in a frame of the optical unit.

* * * * *